Jan. 10, 1967  J. T. HAUB ETAL  3,296,954
DEEP FAT FRYER

Filed Jan. 2, 1964  7 Sheets-Sheet 1

FIG. 1

INVENTORS
JOHN T. HAUB
STANLEY C. RUSTAD
MARK HASTEN
BY *Robert B. Hughes*

ATTORNEY

INVENTORS
JOHN T. HAUB
STANLEY C. RUSTAD
MARK HASTEN
BY Robert B. Hughes
ATTORNEY Jan. 10, 1967 J. T. HAUB ETAL 3,296,954
DEEP FAT FRYER
Filed Jan. 2, 1964 7 Sheets-Sheet 4

FIG. 4

INVENTORS
JOHN T. HAUB
STANLEY C. RUSTAD
MARK HASTEN
BY Robert B. Hughes
ATTORNEY Jan. 10, 1967  J. T. HAUB ETAL  3,296,954
DEEP FAT FRYER Filed Jan. 2, 1964  7 Sheets-Sheet 5

FIG. 5

INVENTORS
JOHN T. HAUB
STANLEY C. RUSTAD
MARK HASTEN
BY *Robert B. Hughes*
ATTORNEY United States Patent Office 3,296,954
Patented Jan. 10, 1967

3,296,954
DEEP FAT FRYER
John T. Haub, Stanley C. Rustad, and Mark Hasten, all of Minneapolis, Minn., assignors to General Mills, Inc., a corporation of Delaware
Filed Jan. 2, 1964, Ser. No. 335,224
6 Claims. (Cl. 99—404)

This invention relates to an improved deep fat fryer especially adapted for a commercial operation.

It is one object of the present invention to provide an improved deep fat fryer in which the total amount of cooking oil being used at any time by the fryer is relatively small with respect to the amount of food which, in the normal operation of the fryer, is being cooked at such time. The result is that the rate at which oil is used by the fryer (i.e. most of the oil being absorbed by the food product being cooked) is large as compared to the total amount of oil being used by the fryer at any one time, so as to reduce the average time which a unit of cooking oil spends in the fryer before it is dissipated (i.e. either absorbed by the food product, or lost as gas or vapor, etc.). The benefit of so reducing this replenishing period for the cooking oil lies primarily in the improved food product that results, for example in terms of longer shelf life of the product, improved palatability, etc.

It is a further object to provide a deep fat fryer with which the cooking time can easily be accurately controlled and/or modified to any degree. More particularly it is an object that the apparatus be capable of being arranged so that the periods of time which the food product spends in the apparatus before, during, and after submersion in the cooking oil can each be easily made to be of any desired length. For example, the amount of drip-off time after the food product comes out of the cooking oil can easily be changed with respect to the amount of time spent in the cooking oil.

It is another object to provide a deep fat fryer which expeditiously and efficiently accomplishes the loading of successive charges of food product into baskets, the submersion of each such basket into an oil bath, the movement of these food carrying baskets through the cooking oil, the lifting of each basket therefrom, the carrying of each basket for a length of time to permit the excess oil to drip off, and the discharge of the food product from the baskets, these foregoing operations being accomplished by a simple, compact, economical, reliable apparatus which is especially desirable for a high output commercial operation.

It is yet another object that in the practice of the present invention low density food products especially can be deep fried properly, in that closed baskets (which are necessary to keep the product submerged in the cooking oil) are provided in a particularly effective manner so that they can very conveniently be loaded and unloaded, and in regard to the manner in which the baskets are submerged and removed from the cooking oil to insure proper frying time of the food product.

These and other objects and features of the invention will be more readily understood and appreciated from the following detailed description of the preferred embodiment thereof selected for purposes of illustration and shown in the accompanying drawings, in which:

FIGURES 12a, b and c are three sequential sectional views taken respectively on lines 12a—12a, 12b—12b, and 12c—12c of FIGURE 2, and illustrating the manner in which a cam lifts the lid of one of the baskets, such as the one shown in FIGURES 8–11, so that each basket can receive a charge of food product to be fried.

In general, the apparatus of the present invention has the general structure of a "merry-go-round," and thus comprises a frame which rotates about a vertical axis and has mounted thereto a plurality of vertically movable food product carrying baskets. Each basket follows a circular generally horizontal path, and in one cycle of revolution has its top lid opened, receives a charge of food product with its lid closing afterwards, is lowered into a deep fry tank filled with hot oil, after travelling a path of predetermined arcuate length through the fry tank is raised out of said tank, travels a predetermined distance to permit the excess cooking oil to drip off, and then discharges its fried food product to complete the processing cycle.

Referring to the accompanying drawings, numeral 10 designates a base frame of general rectangular configuration, on which is carried a motor 12 which through a chain and sprocket drive (consisting of drive sprocket 14, chain 16, and driven sprocket 18) and a speed reducing transmission 20 and clutch 21 turns an upwardly extending shaft 22. This shaft 22 serves as the center drive shaft for a "merry-go-round" frame 24 whom which the several food product carrying baskets 26 are mounted. This vertical shaft 22 is journaled in a center housing 28 of generally cylindrical configuration and supported from the base frame 10.

The aforementioned "merry-go-round" frame 24 comprises a spider 30, the center of which is fixed to the upper end of the center shaft 22 and carrying a screen-like cover 31. Fixed to and depending from the peripheral portion of the spider frame 30 are a plurality of evenly spaced sleeve members 32, in each of which is located for vertical slide motion a respective carrying rod 34, the lower end of which is fixed by means of a bracket 36 to the top portion of a respective basket 26. Each of the sleeve members 32 is provided with an inwardly facing vertical slot 38 to accommodate a related support finger 40 which is fixed to the upper portion of a respective one of each of the basket carrying rods 34. Each such support finger 40 reaches inwardly through the slot 38 of its sleeve 32 a short distance, and carries a respective roller 42, each of the several rollers 42 being mounted for rotary motion about an axis passing through and perpendicular to the aforementioned center shaft 22.

It is by means of these rollers 42 that the elevation of each of the baskets 26 is controlled as it travels a circular path through a processing cycle. To support the various rollers 42, there is provided a track assembly which collectively reaches in a 360° circle, the center of which is coincident with the center axis of the shaft 22. This track assembly comprises an upper and a lower arcuate track portion 44 and 46, respectively, both of which are fixed to the center housing 28, and two intermediate elevator track portions 48 and 50, each of which bridges a respective one of two gaps between the ends of the upper and lower tracks 44 and 46. The upper and lower tracks are fixed to the center housing 28 by means of support arms 52, while the intermediate or bridging tracks 48 and 50 (which, as will be apparent hereinafter, are more properly called "elevator tracks") are each carried by a pair of vetrically disposed jacks 54a and b, supported from the base frame 10. Each pair of jacks 54a nd 54b is a commercially available elevating assembly comprising an air jack 54a and a hydraulic jack 54b. The air jack 54a provides the main power to raise or lower its track 48 or 50, while the hydraulic jack 54b has a controlling effect on elevator tracks 48 or 50, so that said tracks 48 and 50 will move upward and downward at a steady predetermined rate. This rate may be changed at any time by adjusting a needle valve for the hydraulic jack 54b.

Figure 3:
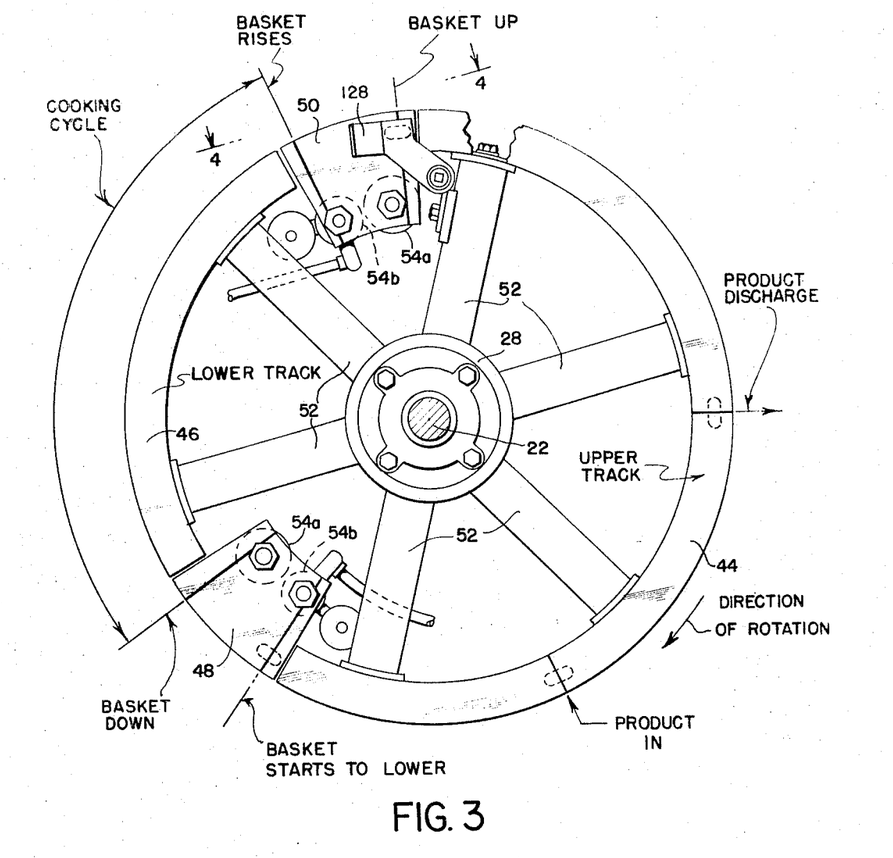
FIGURE 3 is a semi-schematic plan view taken generally on line 3—3 of FIGURE 1 and drawn on an enlarged scale with respect thereto, and arranged to show the mode of operation of the present invention.

The fry tank 56 of the present invention is horizontally disposed, is generally arcuate in its lengthwise dimension, and has a generally rectangular cross sectional configuration. The arc length of the tank 56 is generally coextensive with the total arc length of the lower track 46 and the two elevator tracks 48 and 50. The center of curvature of the tank 56 coincides with the axis of center shaft 22; the width of the tank 56 is moderately larger than that of the baskets 26; and the radius of curvature of the tank 56 corresponds to the radius of the circular path of travel of the baskets 26. As illustrated in FIGURE 3, the direction of rotation of the frame 24 is clockwise (the clockwise direction being considered herein as "forward"). As each basket 26 reaches a position where its support roller 42 rides into the elevator track 48, this track 48 descends so that this basket 26 is submerged in the cooking oil 58 in the tank 56, and when the support roller 42 of each basket 26 reaches the elevator track 50, this track 50 rises to lift this basket 26 out of the oil bath 58.

The tank 56 is provided with an oil inlet 56a, an oil outlet 56b and an overflow pipe 56c. Desirably, the oil is constantly recirculated through the tank 56 and is heated at a location removed from the tank 56. As oil is absorbed by the food product being fried, additional oil is fed into the system by suitable means (not shown herein). Beneath the path of travel of the baskets 26 other than through the fry tank 56, there is an apron 57 to catch the oil from the baskets 56 and the food product contained therein, and direct the oil back to the tank 56, or to a drain as the case may be.

Figures 6, 7, 7A:
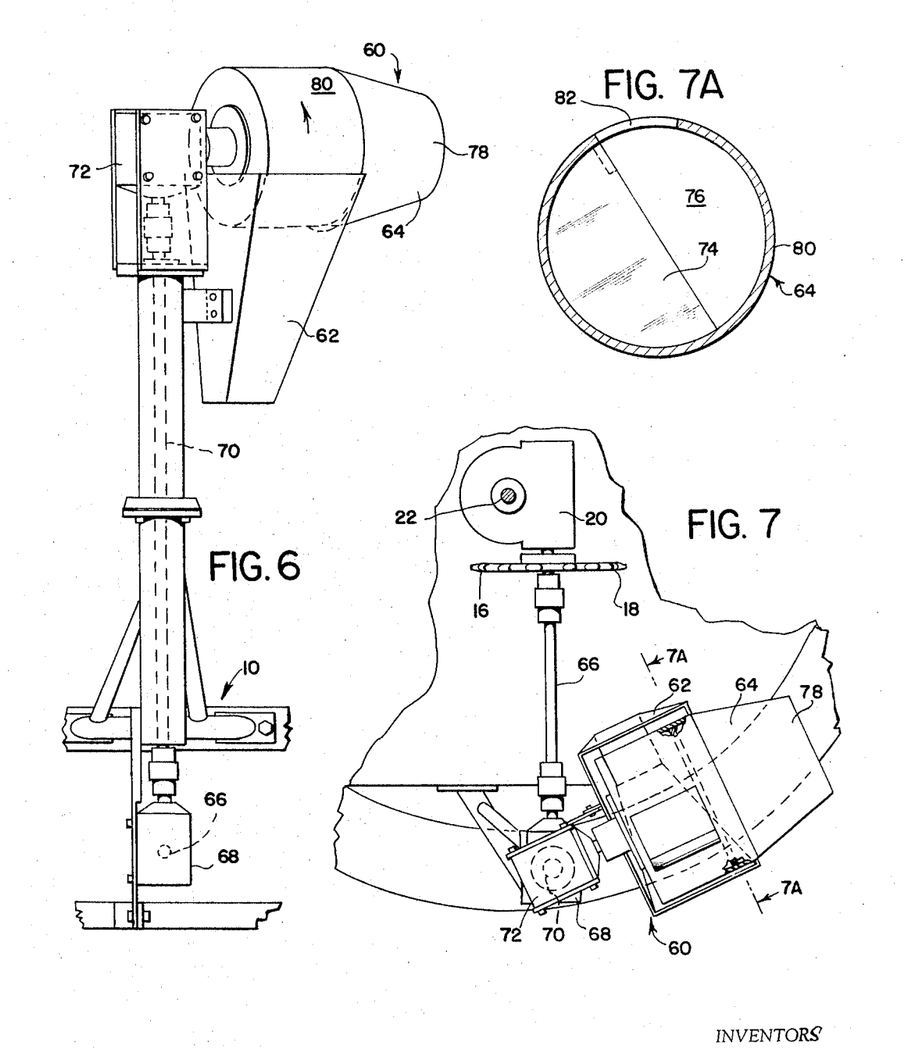
FIGURE 6 is a view taken in side elevation generally along line 6—6 of FIGURE 2 and showing only the feed mechanism by which a food product is fed into the food carrying baskets of the apparatus.
FIGURE 7 is a top plan view of that portion of the apparatus illustrated in FIGURE 6.
FIGURE 7a is a sectional view taken on line 7a—7a of FIGURE 7.
Figure 8:
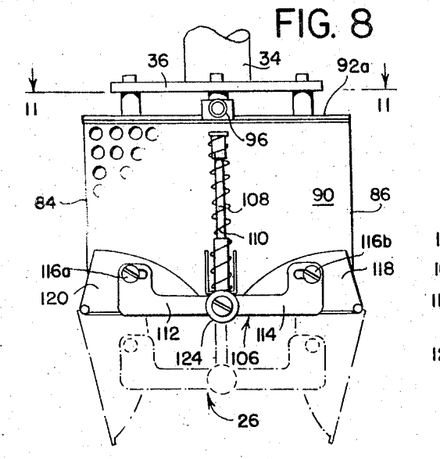
FIGURES 8–11 are views of one of the product carrying baskets of the present invention, these figures being, respectively, an outer side view, a rear view, a bottom view, and a top view.
Figure 9:
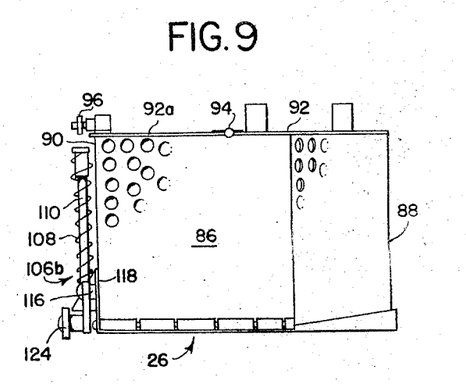
Figure 10:
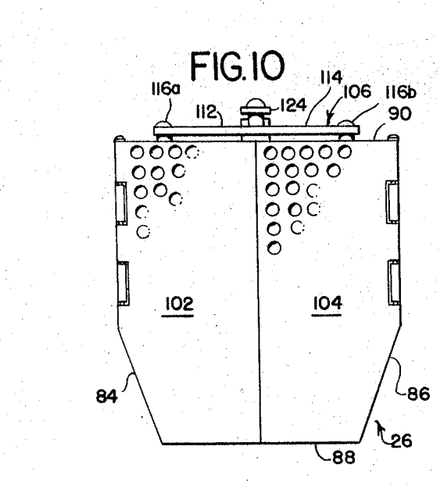
Figure 11:
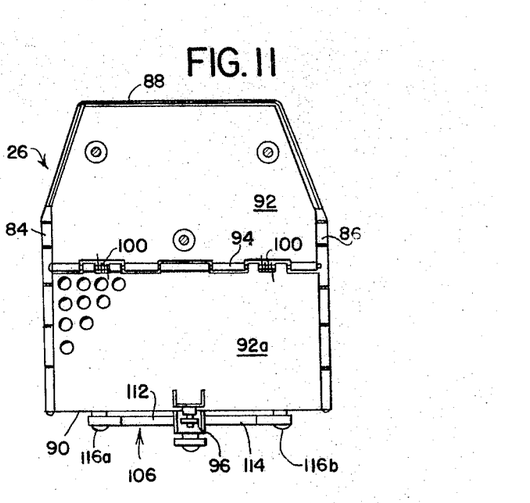

The food product feed mechanism of the present invention is generally designated 60 and is located a short distance rearwardly of (i.e. counter-clockwise from) the angular location of the basket lowering elevator track 48. This feed mechanism 60 comprises a feed hopper 62 and a surmounting drum 64 which rotates about a horizontal axis in timed relation with the rotational motion of the merry-go-round frame 24. The drive transmission to accomplish this comprises (as shown in FIGURES 6 and 7) a horizontal shaft 66 driven from the aforementioned sprocket 18 and connected through a right angle gear box 68 to a vertical shaft 70 which turns the drum 64 through a second right angle gear box 72. The drum 64 has at its midlength a semi-circular transverse plate 74 which extends half way across the chamber 76 defined by the drum 64 to define intercommunicating front and rear portions of the chamber 76. The food product to be fried is fed continuously into the infeed end 78 of the drum 64 to flow into the chamber 76 defined by the drum 64. The cylindrical wall 80 of the drum 64 is provided with an outfeed opening 82 at a location forward of the transverse plate 74 so that when the drum 64 rotates to a predetermined angular position, the food product therein is discharged in a batch into the mouth of the feed hopper 62 and then into a basket 26, which at this time is passing directly beneath the discharge end of the hopper 62.

Figures 12A, 12B, 12C:
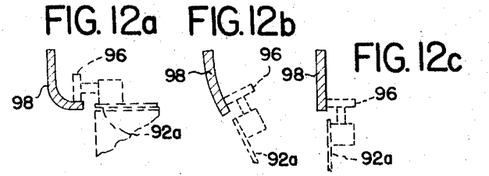

Each of the baskets 26 of the present invention is perforate to permit the free flow of cooking oil therethrough and has a generally rectangular configuration with the inner end thereof tapered somewhat because of the circular arrangement of the baskets 26. Each basket 26 comprises a front and rear wall 84 and 86, respectively, and inwardly and outwardly located (with respect to the center shaft 22) side walls 88 and 90, respectively. The inside portion of the top wall 92 is rigid with respect to the basket 26, while the front portion 92a of the top wall 92 is formed as a flap hinged at 94 so as to swing upwardly and inwardly toward the center shaft 22. The outer free end of the flap 92a is provided with a cam roller 96 to engage a cam 98 which reaches from a location moderately to the rear of the feed mechanism 60 to the location thereof. This cam 98 is so contoured that as each basket 26 approaches the feed mechanism 60, its cam roller 96 engages the cam 98, with the result that its related hinged cover 92a is lifted to a vertical position so that the basket 26 can receive a charge of food product to be fried. (The sequence of this action is illustrated in FIGURES 12a, b and c.) After the particular basket 26 has passed by its feed station (i.e. the location of the feed mechanism 60) the cover 92a is urged downwardly by a pair of hinge springs 100 to close the top of the basket 26.

So that the food product, after being fried, can be discharged from the baskets 26, each basket 26 has two bottom flaps 102 and 104 hinged to the lower edge of, respectively, the front wall 84 and the rear wall 86. These flaps 102 and 104 are normally retained in their horizontal closed position by means of an inverted T-bar 106 mounted for vertical motion to the outer side face of its respective basket 26. The center member 108 of the T-bar 106 is urged upwardly by a spring 110 sleeved thereon, while each shoulder portion 112 and 114, respectively, of the T-bar 106 engages a related one of two pins 116a and b, secured to a related one of two gates 118 and 120 fixed to, respectively, the front and rear flaps 102 and 104. Located counter-clockwise of both the feed mechanism 60 and the aforementioned cam 98, is a discharge cam 122, which functions to engage a cam roller 124 secured to a respective T-bar 106 and depress the same. This causes the two shoulders 112 and 114 to depress both of the flaps 102 and 104 and discharge the fried food product out the bottom of the basket 26. At this discharge station there is provided a hopper 126 to receive the fried food product and carry it to a suitable receptacle or conveyor or the like.

In operation, the motor 12 turns the merry-go-round frame 24 clockwise, with the baskets 26 mounted thereon thus travelling successive cycles of revolution. As each basket 26 approaches the feed station where it receives a charge of food product to be fried, its cam roller 96 engages the feed cam 98 which lifts its hinged mounted cover 92a so that a charge of food product from the feed mechanism 60 is deposited therein. As described hereinbefore, this feed mechanism 60, driven from the same motor 12 which rotates the frame 24 and the baskets 26, discharges its product in timed relationship with the movement of the baskets 26. As each basket 26 leaves its feed station, it travels to the angular location of the basket lowering elevator track 48. As the support roller 42 of each basket travels onto the elevator track 48, this track 48 descends to the level of the lower track 46, to lower such basket 26 at the infeed end of the tank 56 into the oil bath contained by the fry tank 56. After the roller 42 moves onto the lower track 46, the elevator track 48 raises to the level of the upper track 44 to receive the roller 42 of the next basket 26.

As the "merry-go-round" frame 24 continues to turn, each basket 26 travels through the oil bath 58 (with the food product being held in the oil bath by the top cover 92 and flap 92a) until its support roller 42 moves onto the basket raising elevator track 50. At such time, this elevator track 50 lifts the support roller 42 to the level of the upper track 44 to raise this basket 26 out of the oil bath 58. As the roller 42 moves onto the upper track 44, the elevator track 50 descends to the level of the lower track 46 to receive the roller 42 of the next basket 26. This elevated basket 26 continues to travel a moderate distance along an arcuate path while the excess oil on the fried food product drips onto the apron 57. After this, the cam roller 124 on the T-bar 106 engages the discharge cam 122 so that the T-bar 106 is lowered to open the bottom flaps 102 and 104 of the basket 26. The finished product falls out the bottom of the basket 26 into the discharge hopper 126 to complete the frying of one charge of food product.

Figure 4:
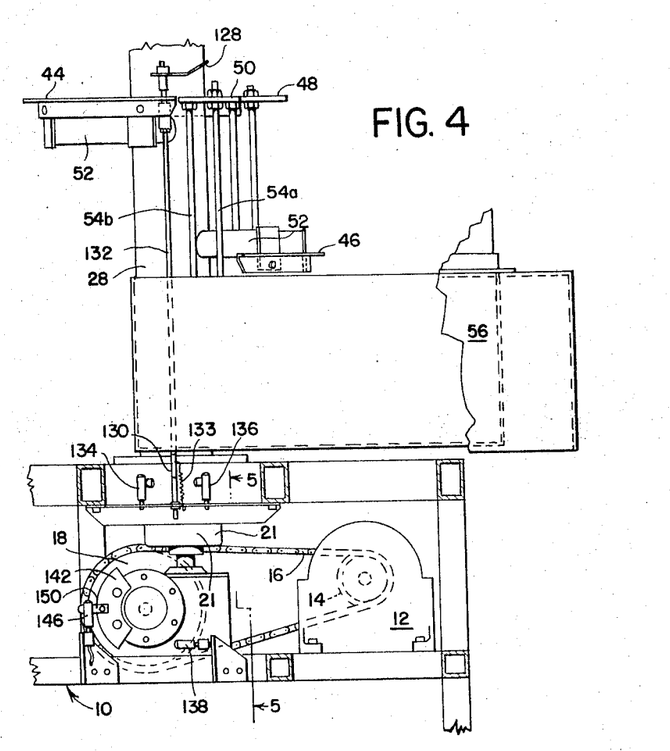
FIGURE 4 is a view taken generally in side elevation along the vertical plane indicated at 4—4 of FIGURE 3, and illustrating the operation of the lift mechanism which raises the food product out of the oil tank.
Figure 5:
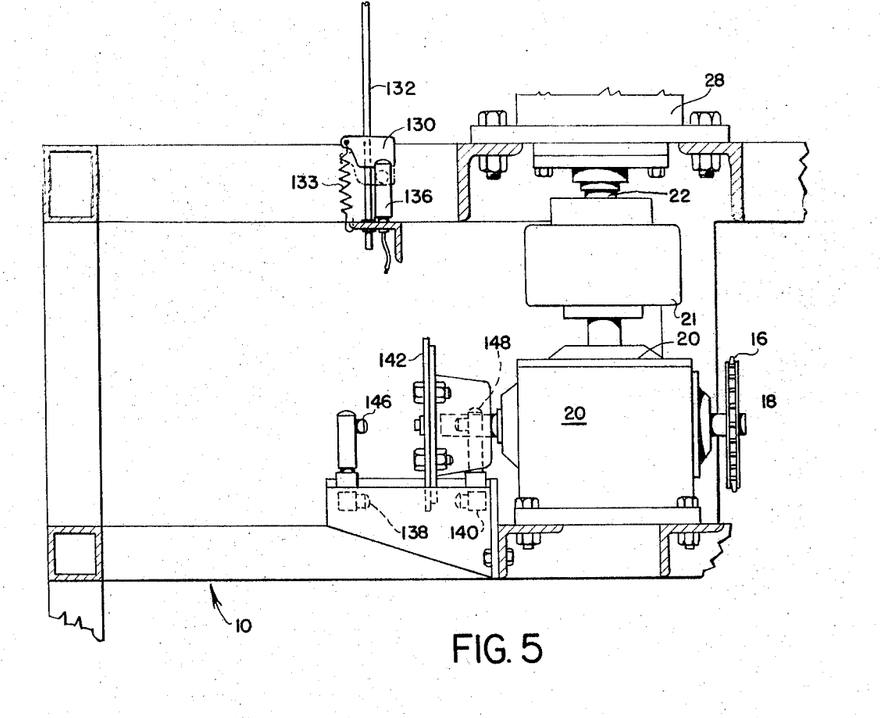
FIGURE 5 is a sectional view taken generally on line 5—5 of FIGURE 4, and drawn to an enlarged scale.

It will be noted from examining FIGURE 4 that as each support roller 42 is lifted with its basket 26 by the basket raising elevator track 50 to the level of the upper track 44, this roller 42 engages a cam 128 to lift the same. This cam 128 is connected to a flag 130 through a depending rod 132. This flag 130 is normally urged downwardly by a spring 133 to be positioned between a light source 134 and a photoelectric cell 136, so that the action of each roller 42 engaging the cam 128 and lifting the flag 130 permits the light source 134 to energize the photoelectric cell 136. A second light source 138 and a related photo tube 140 are positioned so that the path therebetween is broken periodically by a rotating cam 142 driven through the aforementioned speed reducing transmission 20. This cam 142 is so operated from the gear speed reducing transmission 20 that immediately after each basket 16 has been lifted so that its roller 42 engages the cam 128, the other cam 142 blocks the path between the light source 138 and tube 140.

The two light source and photo tube units 134–136 and 138–140 are connected in parallel in a manner that one or the other of the photo tubes 136 and 140 must be energized to permit the motor 12 to turn. Thus, with the apparatus of the present invention operating properly, when a basket 26 is lifted out of the tank by the elevator track 50 so that its support roller 42 engages the cam 128, the safety flag 130 is lifted and the photo tube 136 is energized from its light source 134. Immediately after this, the cam 142 passes between the light source 138 and photo tube 140, but this has no effect on the operation of the apparatus, since the photo tube 136, in parallel with the tube 140, is now energized. However, if because of some malfunction, the elevator track 50 does not lift the basket 26 from the tank 56, so that the safety flag 130 is not raised, as the cam 142 passes between the light source 138 and the photo tube 140, neither of the photo tubes 136 or 140 is being energized, and the motor 12 is de-energized to stop rotation of the "merry-go-round" frame 24. This prevents a basket 26 from being jammed against the structure of the upper track 44.

A third light source and photo tube unit 146–148 can be provided and operated from a cam finger 150, secured to the aforementioned cam 142, to initiate the lifting of the elevator track 50. As with the light source and photo tube units 134–136 and 138–140, a similar fail-safe arrangement can be provided for this basket lowering elevator track 48.

Figure 1:
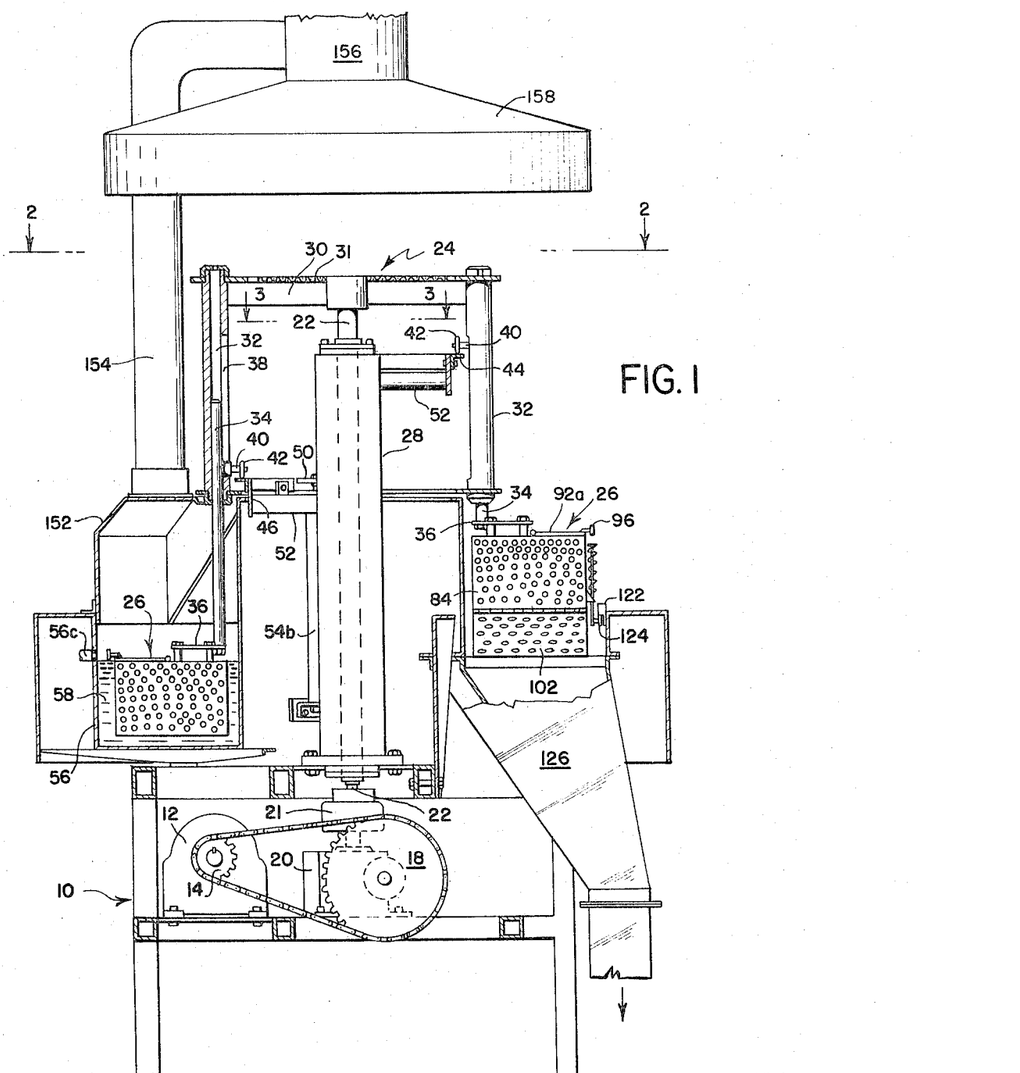
FIGURE 1 is a fragmentary view taken partly in side elevation and partly in section, the portions in section being taken generally along line 1—1 of FIGURE 2.
Figure 2:
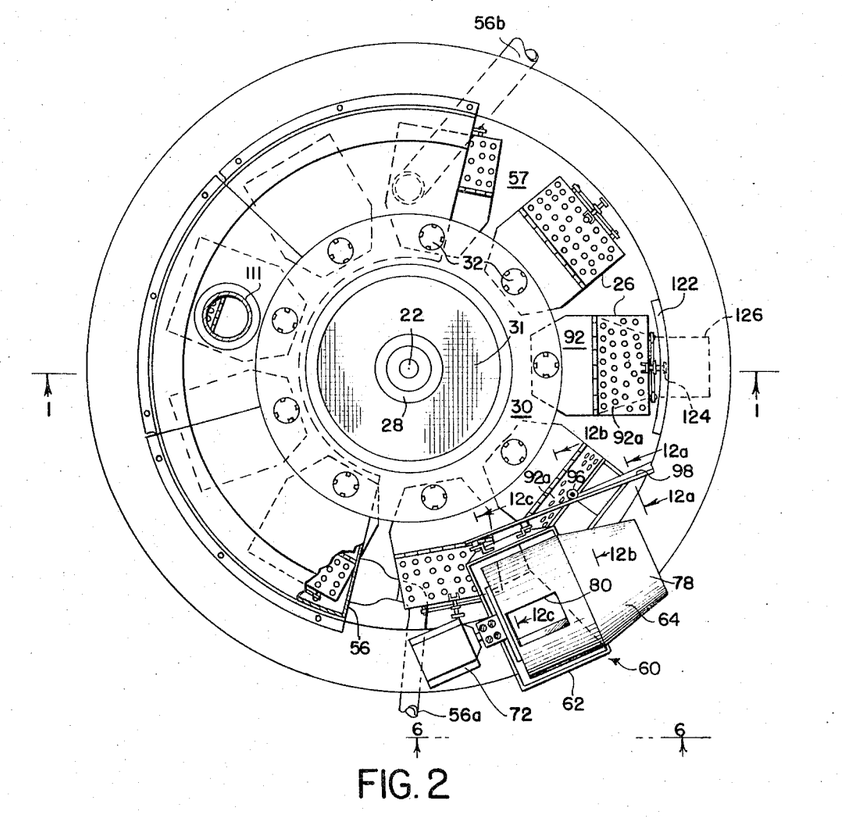
FIGURE 2 is a plan sectional view taken on line 2—2 of FIGURE 1.

As will be noted in FIGURE 1, the present apparatus is conveniently provided with a cover 152 for the fry tank 56 so as to contain the fumes emanating from the oil bath 58. This cover 152 is connected through a conduit 154 to a discharge conduit 156. Likewise, an overhead cover 158 also leading to the conduit 156 can be provided over the entire deep frying apparatus.

As is readily suggested from an examination of the schematic drawing of FIGURE 3, by selecting different arcuate lengths for the upper and lower tracks 44 and 46 (and, of course, correspondingly changing the arcuate length of the tank 56 and the angular locations of other components), and/or by changing the speed of rotation of the merry-go-round 24, various changes in the processing conditions can be accomplished. That is to say, the length of time during which the food product is fried or permitted to drip off excess oil before discharge, or of some other phase of the operation, can be changed either with or without changing the time periods involved in other phases of the operation.

It should be understood that the foregoing is merely illustrative of a certain embodiment of the invention and many variations may be made by those skilled in the art without departing from the spirit and scope of the invention.

Now therefore, we claim:
1. A deep fat fryer, comprising:
 (a) a mounting structure,
 (b) a merry-go-round frame mounted to said structure for rotary motion about a generally vertical axis,
 (c) a plurality of food carrying baskets mounted to said frame so as to be moved in a generally circular path thereby, and movable vertically with respect to said frame, the direction of rotation of said baskets being considered as being forward,
 (d) a generally circularly curved deep fry tank, the length of which is located along an arc length of said circular path of said baskets, said tank having a rearwardly located infeed end and a forwardly located outfeed end,
 (e) a track assembly extending substantially in a circle about the axis of said merry-go-round frame, said track assembly comprising a lower portion being generally coextensive with and having generally the same angular location as said fry tank, an upper portion located generally diametrically opposite to said lower track portion, and two elevator track portions, each located between respective proximate ends of said upper and lower track portions, said elevator portions each being movable between the elevation of said upper track and said lower track,
 (f) each of said baskets having secured thereto a track riding member by which each of said baskets is supported from said track assembly, whereby each of said baskets as it travels a circular path, is lowered into said tank by one of said elevator track portions, moves through said tank from the infeed end to the outfeed end thereof, and is lifted from said tank by the other of said elevator portions to travel on said upper track portion.

2. The apparatus as recited in claim 1, wherein there is feed means located generally rearwardly of the infeed end of said tank to deliver food to be fried into each of said baskets, each of said baskets having a lid movable to an open position, and cam means at the general location of said feed means to engage the lid of each basket so as to open the same so that food can be delivered into each of said baskets.

3. The fryer as recited in claim 2, wherein each of said baskets has a bottom portion movable to an open position, and there is discharge cam means located between the discharge end of said tank and said feed means to engage the bottom portion of each basket so as to move the same to an open position and discharge the fried food product from each of said baskets.

4. The apparatus as recited in claim 1, wherein there is safety means comprising two units, one of which must be in a state of activation to permit said merry-go-round frame to turn, one of said units being activated by the action of each basket being elevated by the other of said elevator track portions to the level of said upper track, and the other of said units being normally activated but having means associated therewith which render it inactive during the time each basket is being lifted to be supported by said upper track.

5. The fryer as recited in claim 1, wherein said merry-go-round frame provides a plurality of vertical slide ways, one for each basket, and each basket has mounting means engaged in a related slide way so as to be movable vertically with respect thereto.

6. A deep fat fryer, comprising:
 (a) a mounting structure,
 (b) a merry-go-round frame mounted to said structure for rotary motion about a generally vertical axis,
 (c) food carrying means engaged by said frame so as to follow a generally circular path as said frame rotates, the direction of rotation of such frame considered as being forward,
 (d) a generally circularly curved deep fry tank, the length of which is located along an arc length of said circular path of said food carrying means, said tank having a rearwardly located infeed end and a forwardly located outfeed end,
 (e) a feed means located generally rearwardly of the infeed end of said tank to deliver food to be fried into said food carrying means prior to submersion thereof in said tank,
 (f) said food carrying means comprising a plurality of carrying units, each of which comprises a basket which moves along said circular path, part of which path is through said fry tank, each of said baskets being mounted to said merry-go-round frame for vertical motion with respect thereto,
 (g) elevating means to lower said food carrying means into the infeed end of said tank and to raise said food carrying means from the outfeed end of said tank so that said food carrying means is moved through said tank by the rotation of said merry-go-round frame,
 (h) a discharge means to cause said food to be removed from said food carrying means, said discharge means being located generally forward of the outfeed end of said tank, and rearward of said feed means, and
 (i) a track assembly extending substantially in a circle about the axis of rotation of said merry-go-round frame, each of said baskets being supported by said track assembly, said track assembly comprising a first portion being generally coextensive with and so disposed at the same angular location as said fry tank so that each of said baskets is submerged as it is moving along said first portion of the track assembly, said track assembly also comprising a second portion located generally diametrically opposite to said first portion and also comprising two vertically movable elevator portions, each of which is located between respective proximate ends of said first and second track portions, said elevator portions functioning to carry said baskets from said second portion to the infeed end of said first portion and from the outfeed end of said first portion to the second portion.

References Cited by the Examiner

UNITED STATES PATENTS

| 1,310,495 | 7/1919 | Ford | 99—404 |
| 1,890,737 | 12/1932 | Leweke | 99—337 |
| 1,961,532 | 6/1934 | Snyder | 99—354 |
| 1,993,609 | 3/1935 | Kennedy | 99—354 |
| 2,147,335 | 2/1939 | DeFazi | 99—404 |
| 2,997,190 | 8/1961 | Reed | 214—59 X |
| 3,022,722 | 2/1962 | Arvan. | |
| 3,036,513 | 5/1962 | Reeves | 99—404 |

FOREIGN PATENTS

| 1,227,083 | 2/1960 | France. |

WALTER A. SCHEEL, *Primary Examiner.*

WILLIAM I. PRICE, *Examiner.*

S. P. FISHER, *Assistant Examiner.*